Oct. 10, 1939.  W. W. DAVIDSON  2,175,167
MACHINE FOR SEPARATING AND FEEDING BLANKS
Filed Sept. 27, 1935  8 Sheets-Sheet 3

Inventor
Wm. Ward Davidson.
By Geo. E. Walds.
Atty

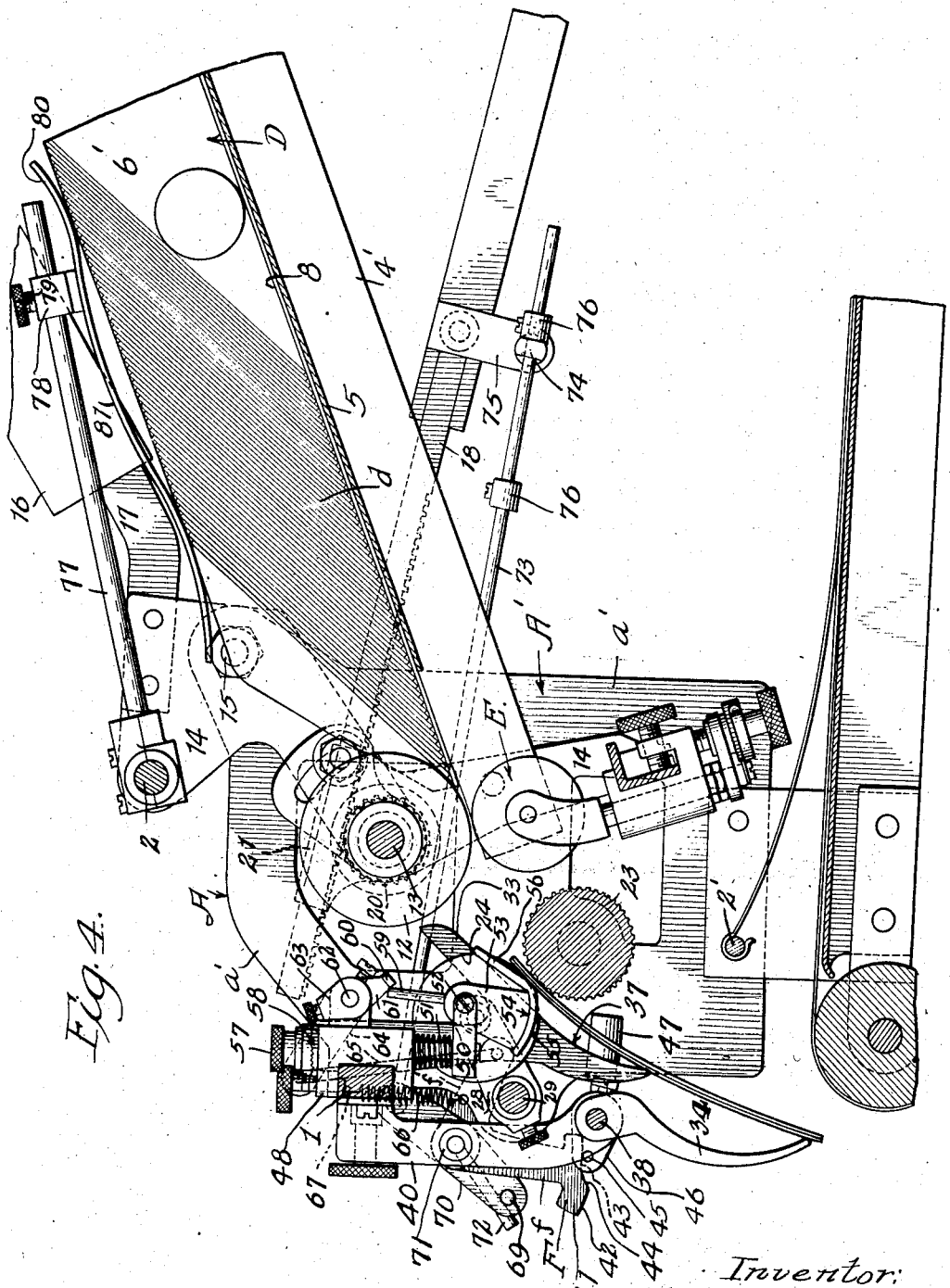

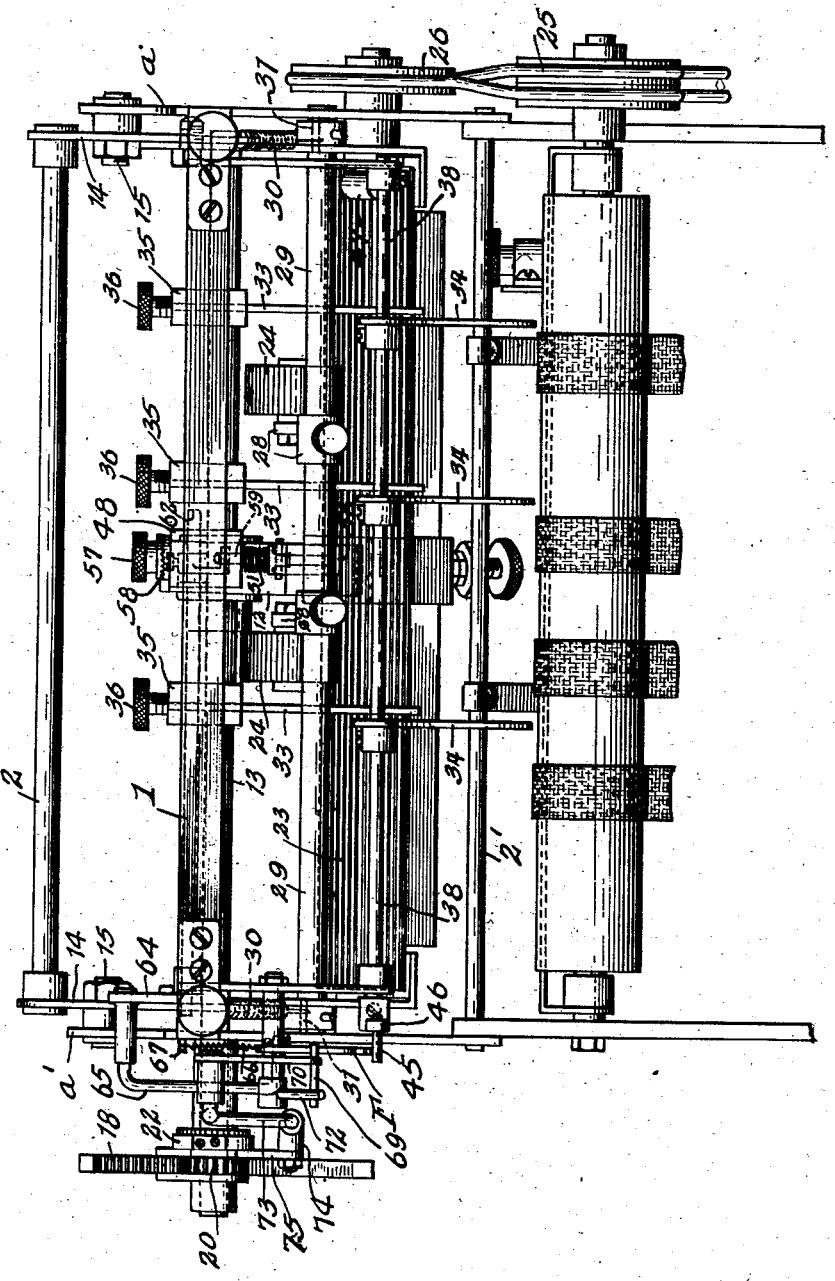

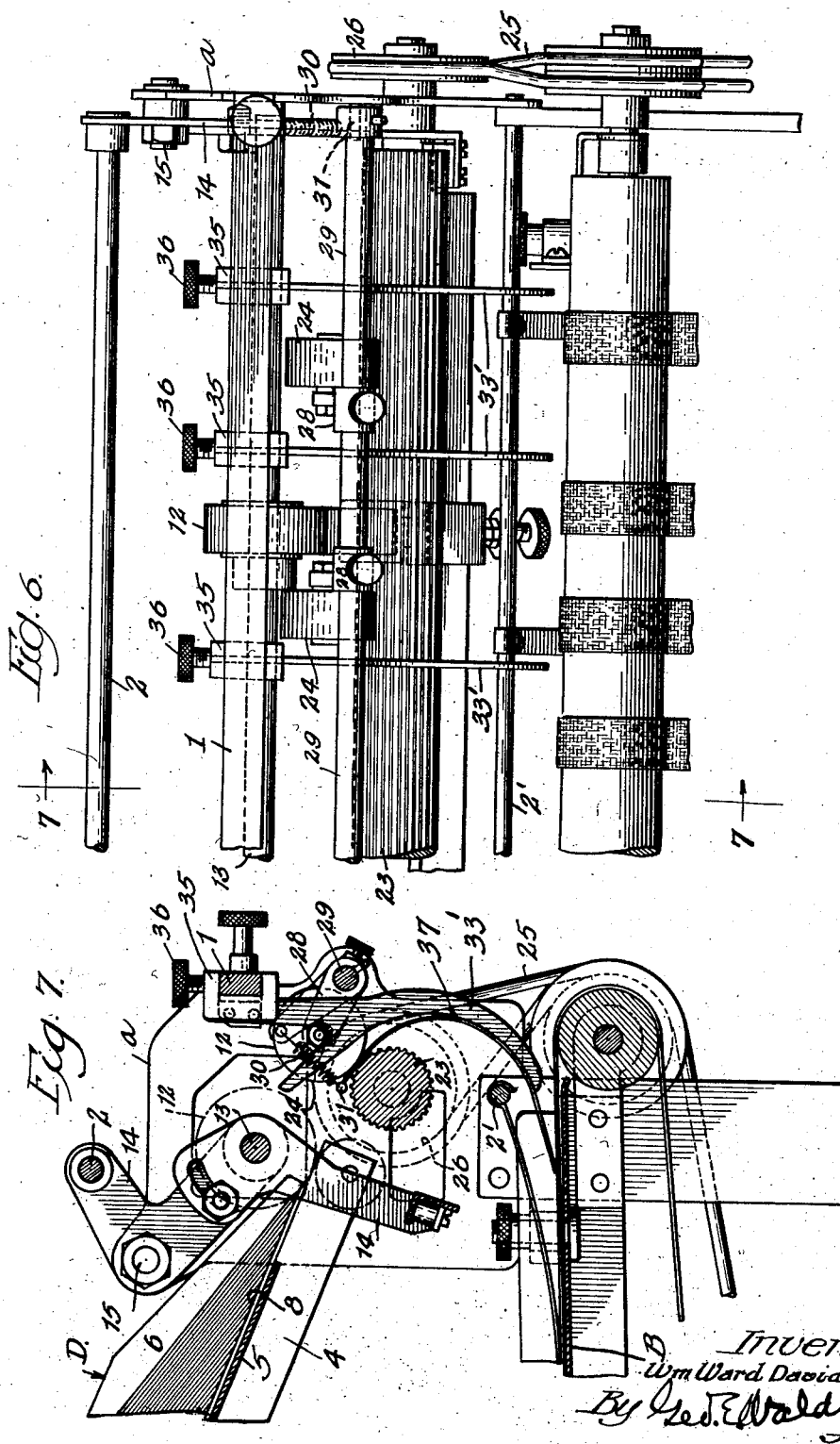

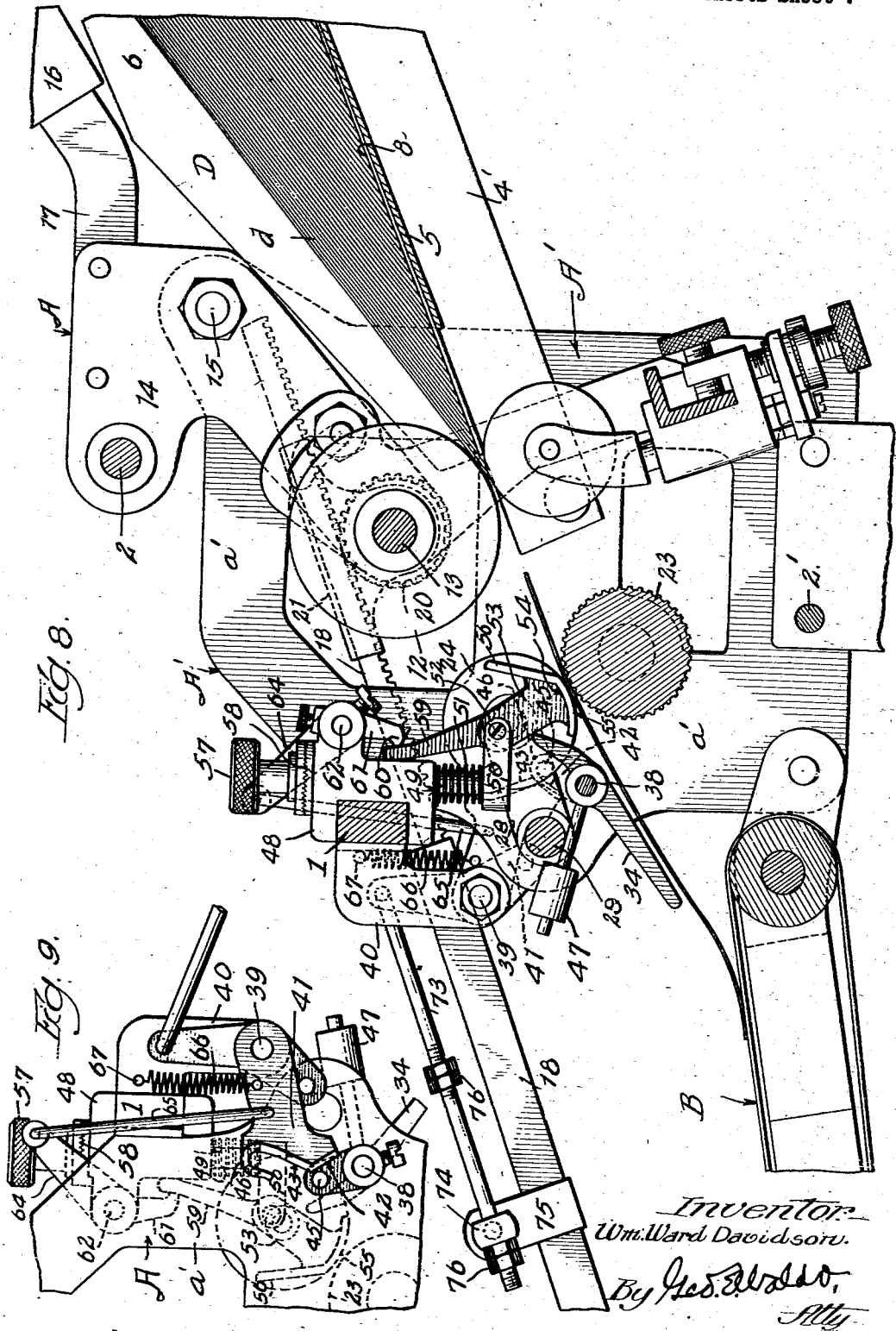

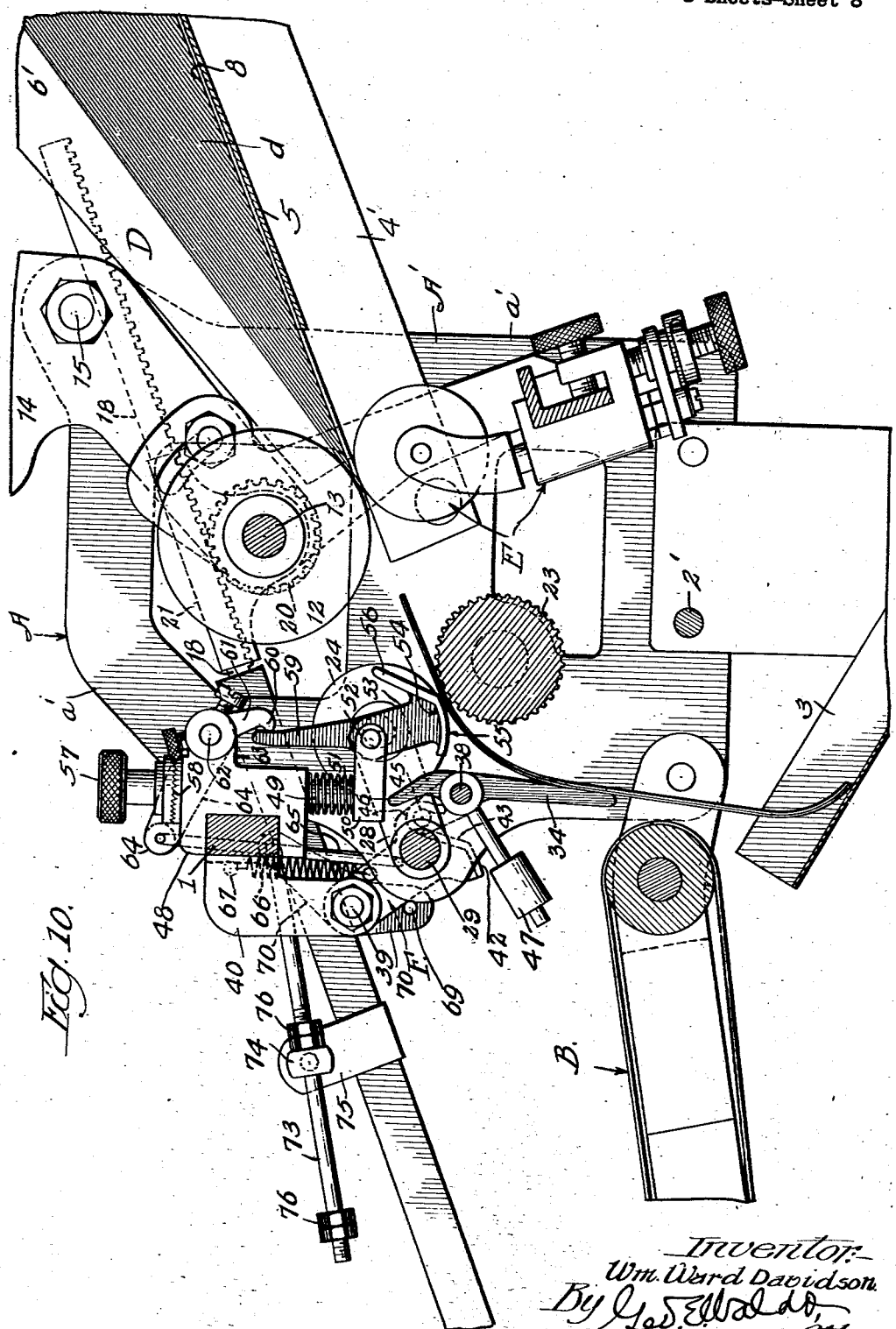

Patented Oct. 10, 1939

2,175,167

UNITED STATES PATENT OFFICE 2,175,167

MACHINE FOR SEPARATING AND FEEDING BLANKS

William Ward Davidson, Evanston, Ill., assignor to Davidson Equipment Corporation, Chicago, Ill., a corporation of Illinois Application September 27, 1935, Serial No. 42,447

11 Claims. (Cl. 209—88)

This invention relates to machines for separating and feeding blanks, such as sheets of paper, cards, envelopes, book signatures, pamphlets and the like.

An important object of the invention is to reduce the floor space or area required for operatively mounting a blank separating and feeding machine in association with other devices or mechanism, as a conveyor board onto which the blanks are delivered by said blank separating and feeding machine, and which, in turn, may be arranged to deliver said blanks to still another device or mechanism, which we may assume is a known form of printing press, hereinafter designated "the primary machine".

To effect the foregoing object, I mount the conveyor board beneath the blank separating and feeding devices of the feeder and provide means at the discharge end thereof constructed and arranged to guide blanks from the feed devices thereof downwards around the discharge end of said feeder onto the receiving end of the conveyor board, and thence to the feed devices of the primary machine, if any.

A further object of the invention is the provision of means, rendered operative by movement of fed blanks, for detecting doubles—that is the simultaneous feeding of a plurality of superposed blanks—and diverting said doubles elsewhere than upon the conveyor board beneath the blank separating machine.

To effect the foregoing object, the invention comprises the various features, combinations of features and details of construction hereinafter described and claimed.

Other objects of the invention will hereinafter appear.

In the accompanying drawings, in which the invention is fully illustrated—

Figure 2:
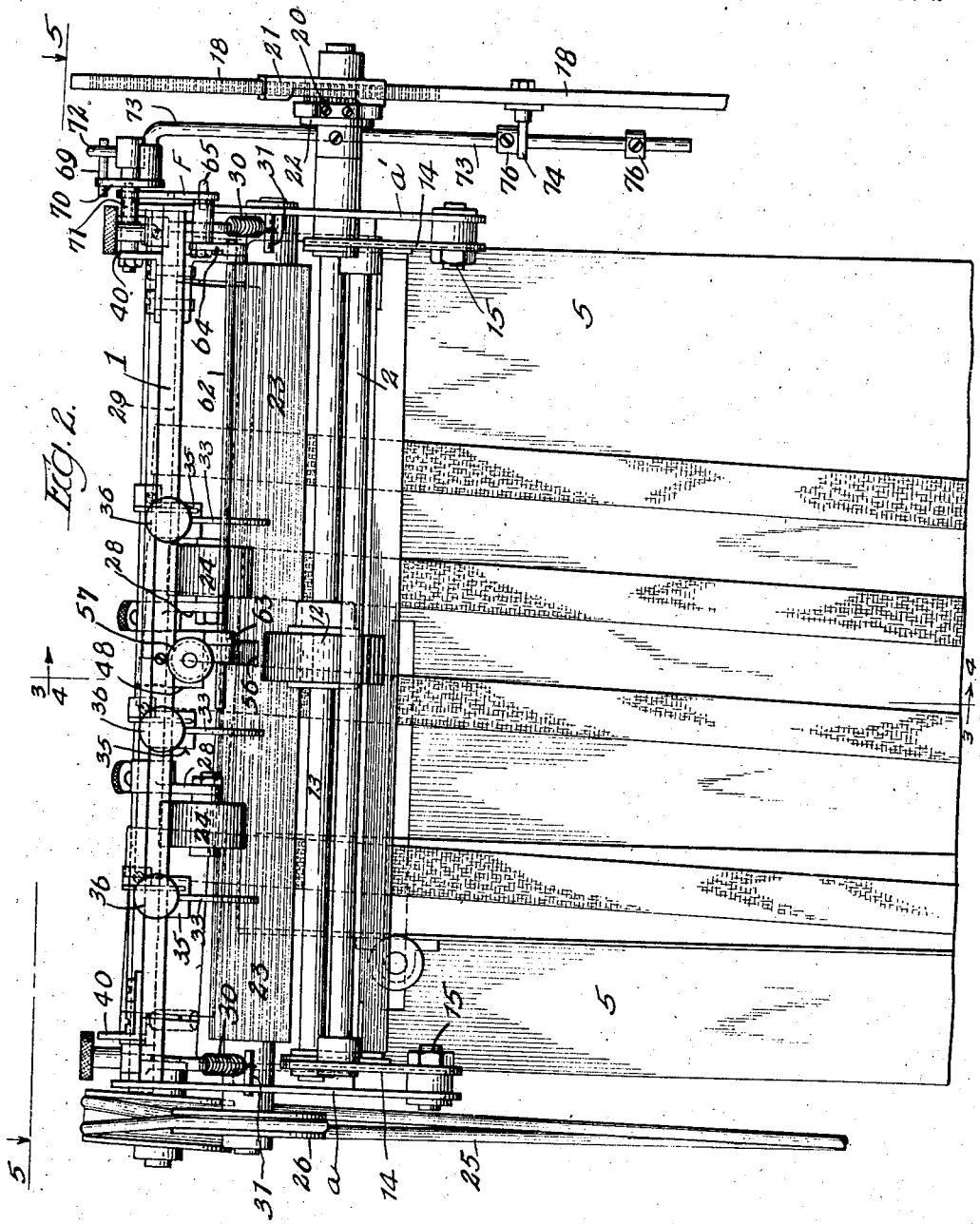
Figure 2 is a top plan view of the discharge end of a machine for separating and feeding blanks, comprising blank guiding and doubles detecting and diverting means, in accordance with my invention.
Figure 3:
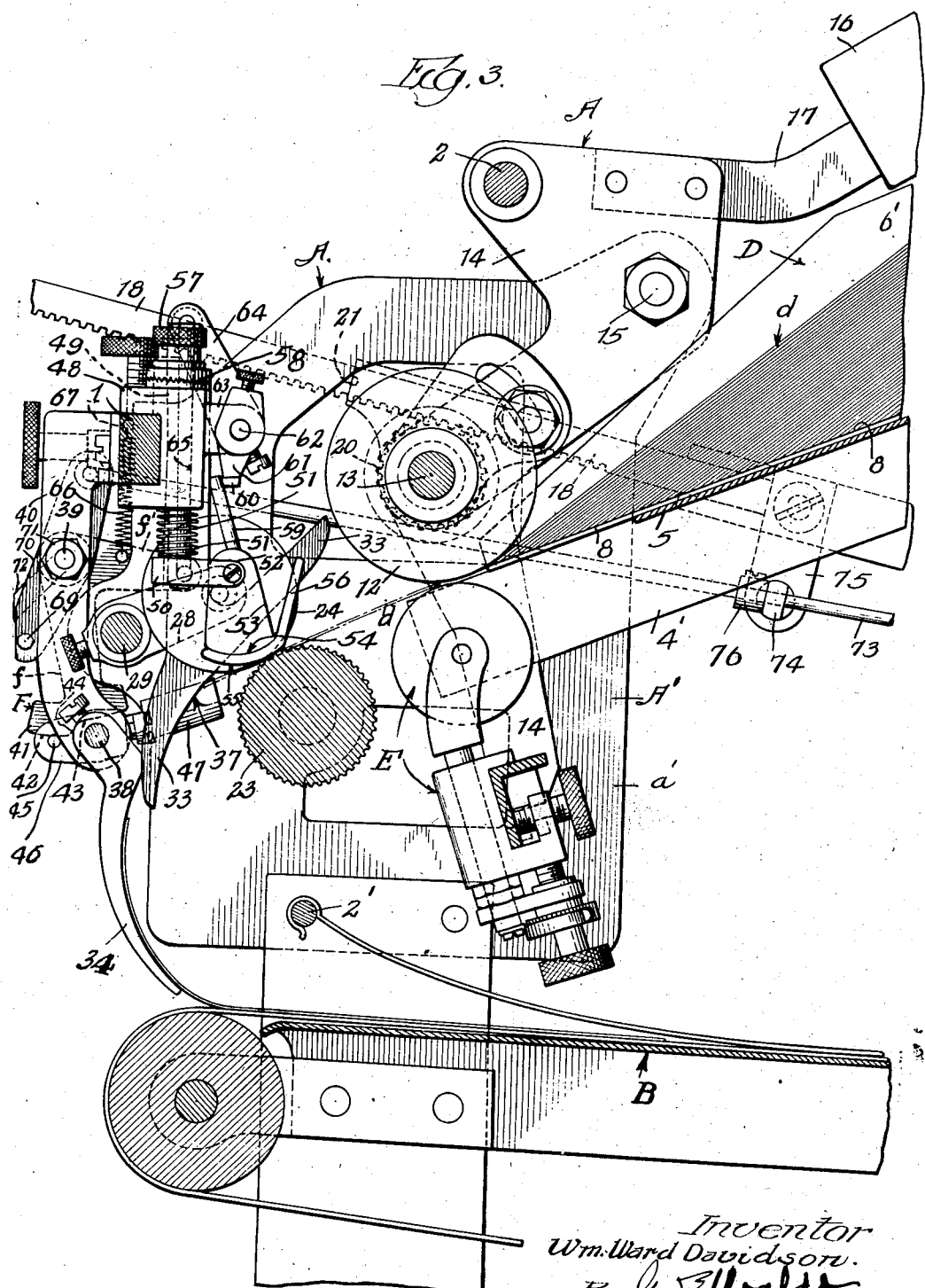

Figures 3 and 4 are sectional side views, both taken on the line 3—3, and 4—4, of Fig. 2; Fig. 3 showing conveyor and guide means arranged to deliver separated blanks from the blank separating machine to the primary machine; and Fig. 4 showing said conveyor and guide means in position to divert doubles, or superposed blanks;

Figure 5 is an end elevation of the blank separating machine, viewed from the position 5—5, Fig. 2;

Figures 6 and 7 are views, substantially similar, respectively, to Figs. 5 and 3, illustrating an adaptation;

Figure 8 is a view corresponding, substantially, to Fig. 3, embodying and illustrating another adaptation;

Figure 9 is a fragmentary view of the adaptation shown in Fig. 8, as viewed from the opposite side of the machine, the parts of the machine being shown in non-diverting relation; and Figure 10 is a view similar to Fig. 8, showing the parts of the machine in position to divert superposed blanks.

Describing the invention with reference to the drawings, I will, in the first instance, describe the installation shown in Figs. 1 to 5, inclusive, of the drawings, which comprises a blank separating and feeding machine, designated as a whole, A, a conveyor board, designated as a whole B, mounted in position to receive separated blanks from the blank separating and feeding machine A and to deliver them onto the conveyor board, and thence to a point of use, such as a primary machine C, which we may assume is a commercial form of printing press.

In the following description, the designations "right" and "left" have reference to the various parts and units of the installation as viewed from a position at the left of Fig. 2.

Also, as used herein, "doubles" or "double feeding" designates the simultaneous feeding of a plurality of superposed blanks.

The operative parts of the separating and feed machine A, are mounted on a suitable frame, for convenient reference, designated as a whole A', which comprises front and rear frame members $a$, $a'$, rigidly connected in spaced relation by a transverse bar 1 and rod 2'.

Figure 1:
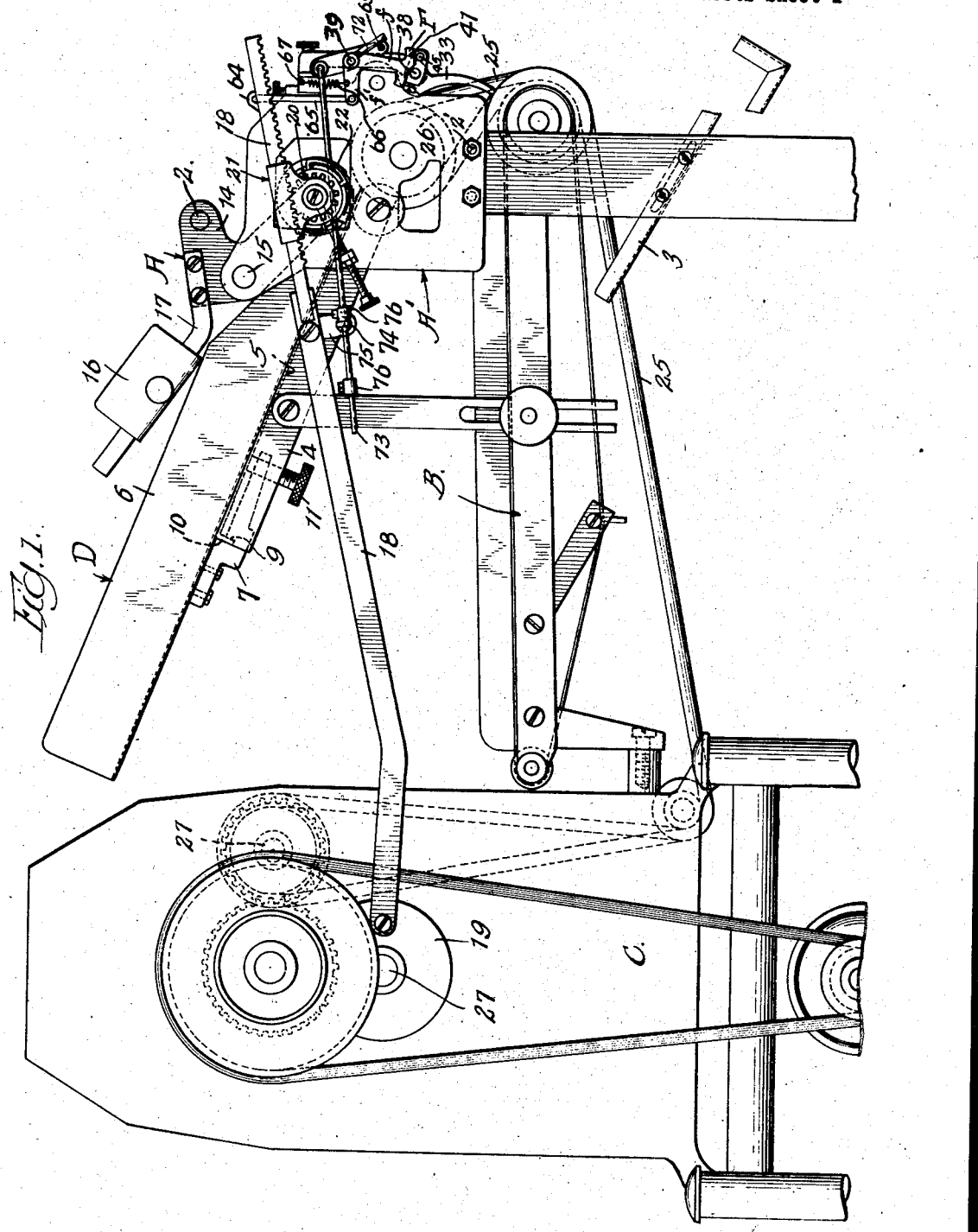
Figure 1 is a side view of a blank separating and feeding machine embodying my invention and improvements, shown as mounted in operative association with a primary machine, which we may assume is a known form of commercial printing machine.

As stated generally in the preamble of the specification, I attain the objects of the invention, as it relates to reducing or conserving floor space, required for mounting the installation—consisting, as shown, of the feeder A, the conveyor board B, and a primary machine C—by mounting said conveyor board directly beneath the blank separating and feeding machine A, and in providing guide means mounted in association with the blank separating and feeding devices of said feeder, and at the discharge end thereof, for guiding separated blanks around the discharge end of said feeder and, in contemplated operation, delivering them upon the conveyor board B and thence to the primary machine C—or, in the case of doubles, diverting and delivering them elsewhere, as to a tray 3 supported at the discharge end of said feeder, see Fig. 1—all as hereinafter particularly described and pointed out.

As regards their usual features and excepting as hereinafter particularly described and pointed out,—the feeder A, the conveyor board B, and the primary machine C, each may be of any usual or desired construction, and devices suitable for effecting the various functions of said machines or devices, respectively, are known and can be purchased commercially or readily supplied by mechanics skilled in the art to which they respectively belong, from an examination of the drawings.

Briefly described, the feeder proper A, see particularly Figs. 3 and 4, comprises a pack receptacle D consisting of spaced bars 4, 4', pivoted to the side frames a, a', of the machine, a bottom plate 5 secured to said bars, angle bars 6, 6', supported in spaced relation on said bottom plate and adapted to be adjustably secured thereto beyond the outer end of the bottom plate, by suitable locking means, consisting, as shown, see Fig. 1, of members 7—preferably in the form of castings—secured to the under sides of inwardly projecting flanges 8 on the angle bars 6, 6', as by screws or rivets, formed in which are transverse grooves 9 of proper width to receive a depending flange 10 on the rear end of the bottom plate, with desired clearance. As shown, the members 7 are cut away in front of the grooves 9 so that they will be spaced from the bottom plate 5, and threaded through the forward ends of said members 7 are thrust screws 11, the relation being such that turning said screws so that they will exert a thrust on the bottom plate 5, will force the free end of the members 7 away from said bottom plate, causing the depending flanges 10 to bind in the grooves 9, thus securing the angle bars 6 to the bottom plate, in the manner desired. However, the means shown merely exemplify any desired or suitable means for the purpose.

A shown, a pack of blanks d is supported on the bottom plate 5 of the pack receptacle D, and the means for separating and feeding the blanks is of a familiar type comprising a separator roller 12 secured to a shaft 13 rotatably mounted in bearings formed in arms 14, pivoted at 15 to the frame members a, a', the relation being such that the separator roller 12 will be freely movable towards and from the bottom plate 5 of the pack receptacle D, on which the pack of blanks d is supported, and the traction of said separator roller on blanks with which it contacts in operation, being adjustably controlled by means of a counter-weight 16, which is adjustable endwise on a bar 17 secured to the arm 14, in a familiar manner.

As shown, the separator roller 12 is actuated intermittently to separate the feed blanks from the blank receptacle, by suitable connection with a driven member of the primary machine C, consisting of a rack-bar 18, a bearing in one end of which engages a crank pin secured in a driven crank disk on said primary machine, as shown at 19, Fig. 1. The teeth of the rack-bar 18 engage the teeth of a pinion 20 loosely mounted on the separator roll shaft 13, being held in engagement with said pinion by a saddle 21 pivoted on said shaft, to which said rack-bar is slidably fitted, engagement of the pinion 20 with the separator roll shaft to rotate said roll to feed blanks, being effected by a ratchet clutch 22 secured to said shaft, in a familiar manner.

What I now consider a preferable form of clutch for the purpose, is shown in Fig. 9 of the drawings of my prior Patent No. 1,627,015, issued May 3, 1927, and described in the specification of said patent, beginning with line 75 of page 7 thereof, to which reference is here made for a description thereof, without repetition. However, said clutch merely exemplifies any desired or approved clutch for the purpose.

As shown in Figs. 3 and 4 of the drawings, a combined caliper and retard member designed to prevent double feeding, designated as a whole E, is mounted in association with the separator roller 12. However, said caliper and retard member forms no part of the present invention and will not, therefore, be described in detail.

Mounted in association with said separator roll 12 are usual pull-out rollers 23 and 24, of which the roller 23 is driven by a belt 25, which operatively connects a pulley 26 secured to the shaft of said roller 23, with a pulley secured to a driven shaft 27 of the primary machine, as clearly shown in Figs. 1 and 6 of the drawings. The pull-out rollers 24 are rotatably mounted in bearings formed at the ends of arms 28 rigidly secured to a rock-shaft 29, and are held yieldingly in contact with the driven roller 23 by springs 30, opposite ends of which are connected to a supporting arm 28 and to a rigid support, as shown, pins 31 secured in the side frame members a and a', said rollers 24 being driven by frictional contact with the driven roller 23.

Preferably, the pull-out rolls 23 and 24 have a very much higher peripheral speed than the separator roll 12, whereby the rate of travel of blanks d delivered to said pull-out rolls by the separator roll will be accelerated, thus insuring that following blanks will not overlap preceding blanks —the driving of said separator roll by the ratchet clutch 22 permitting over-spin of said separator roller when accelerated blanks are withdrawn by the pull-out rollers, thus relieving said blanks from stresses to which they otherwise would be subjected.

As heretofore stated, the conveyor board B is mounted directly beneath the blank separating and feeding machine A, the receiving end thereof being supported on the frame of the blank separating and feeding machine and its discharge end on the frame of the primary machine C, as best shown in Fig. 1.

While, in accordance with the present invention, I contemplate the use of any desired form of conveyor board suitable for the purpose, I prefer to use the conveyor board which forms the subject-matter of my co-pending application, filed on the 27th day of September, 1936, and numbered serially 42,448, to which reference is here made for a description thereof in detail.

While, as heretofore stated, it is assumed that the primary machine C is a commercial form of printing press, said machine broadly considered, exemplifies any machine which it may be desired to associate with said blank separating and feeding machine.

In accordance with the present invention, I attain the objects thereof, as it relates to guiding separated blanks around the discharge end of the blank separating and feeding machine onto the conveyor board and to diverting doubles, by means as follows—particular reference being had to Figs. 3 and 4 of the drawings, which are substantially duplicates of each other, excepting that Fig. 3 shows the blank guiding and doubles diverting devices in normal position, in which separated blanks will be guided around the end of the blank separating machine onto the conveyor board B, and Fig. 4 showing said blank guiding and diverting means in position to divert doubles and to deposit them elsewhere than onto said conveyor board, as into the tray 3. Being thus similar in construction, the same and corresponding parts of the blank guiding and doubles diverting mechanism may be designated by the same reference characters, and the description thereof will therefore be in the singular.

Referring to said Figs. 3 and 4, said blank guiding and diverting means consists of two sets of guide fingers designated, respectively, 33 and 34. The fingers 33 are secured to heads or blocks 35, which, in turn, are mounted on the bar 1 so as to be adjustable transversely of the machine, being, as shown, provided with open-sided recesses proportioned to receive said bar and being detachably secured thereto, as by clamping screws 36. In operation the fingers 33 are fixed, and the edges of said fingers proximate the discharge end of the blank separating and feeding machine are curved, as shown at 37.

There are also several of the fingers 34 and they are mounted on a rock-shaft 38 having bearings in the side frames $a$, $a'$, of the feeder A, above the lower ends of the fingers 33 and at the opposite side of said fingers from the pull-out roller 23. Said fingers are curved, as shown, and when in position to guide separated blanks onto the conveyor board, their outer ends are in close proximity to the receiving end of the conveyor board, as shown in Fig. 3, the relation being such that the adjacent ends of said sets of fingers will over-lap, with the lower ends of the fingers 33 inside of the upper ends of the fingers 34, so that together the concave edges thereof will define an unobstructed, approximately concave surface, which extends continuously from adjacent the separator roller at a point above the bottom side thereof to the top surface of the conveyor board, substantially as shown in Fig. 3, and which is the position of the various parts of the guiding and diverting mechanism during normal operation— that is, when feeding blanks of a predetermined thickness—and in which position they will be locked during normal feeding, by a cam member designated as a whole F, pivoted at 39 to a vertically disposed bracket 40, the upper end of which is secured to the bar 1 and the lower end of which is provided with a bearing for the rock-shaft 38, to which the fingers 34 are secured so as to turn therewith. Said cam member F is made in the form of a bell-crank, comprising arms $f$, $f'$, of which the arm $f$ extends substantially vertical and the arm $f'$, substantially horizontal.

Formed on the lower end of the vertical arm $f$ is a head 41, formed on the bottom edge of which is a cam surface comprising end stop surfaces 42 and 43 positioned at different radial distances from the pivot of said cam member, and an intermediate inclined cam surface 44 which connects the stop surfaces 42 and 43, co-operating with which is a pin 45 secured in an arm 46 secured to the rock-shaft 38, and a weight 47 applied to said shaft, which, at all times, maintains said shaft at the limit of its turning movement defined by engagement of the pin 45 with a cam section 42 or 43—movement of said cam member F to effect engagement of said pin with the cam section 42, operating to turn and maintain said rock-shaft and the guide fingers 34 secured thereto, into the positions shown in Fig. 3, in which they will guide separated blanks onto the conveyor board B; and movement of said cam member F to effect engagement of said pin 45 with the cam section 43, permitting turning movement of said shaft by the weight 47 to move and maintain the guide fingers 34 into diverting position, shown in Fig. 4.

The weight 47 exemplifies any desired or approved means for maintaining the rock-shaft 38 yieldingly at the limit of its movement defined by engagement of the pin 45 with one or the other of the cam sections 42 or 43.

In contemplated normal operation, that is, so long as the blank separating and feeding machine A delivers blanks to the pull-out rolls 23 and 24 of a thickness less than the adjusted width of the space between the opposed cylindrical surfaces of the pull-out roll 23 and the rock-member 53, the position and relation of the blank guiding and diverting fingers 33 and 34 substantially as shown in Fig. 3 will be unchanged.

A preferred means for discarding blanks of excess thickness is shown in Figs. 3 and 4. It includes a presser bar 49 fitted into a hole formed lengthwise through a block 48 which is secured to the bar 1. The block 48 is movable endwise of the bar 1, but is held against turning movement. The lower end of the presser bar projects below the bottom of the block 48 and secured to which is a foot 50, said bar and foot being maintained yieldingly at the lower limit of their movement, by a coil spring 51 inserted, under compression, between the proximate surfaces of the head 48 and foot 50. Pivoted to lugs 52 on said foot 50 is a rock-member 53 which comprises a portion 54 having a surface 55 which forms a segment of a cylinder concentric with the pivotal axis of said member, the relation being such that said member will be supported with the cylindrical surface thereof spaced from the pull-out roll 23 to provide a space between the opposed surfaces of said pull-out roll and rock-member 53, to permit a single blank $d$ of predetermined thickness to pass freely therethrough, as shown, see Fig. 3. As shown, also said rock-member 53 comprises an extension 56 at the edge of the cylindrical surface 55 proximate the blank separator roll 12, which extends a considerable distance above the pull-out roll 23 and is inclined at such an angle to the movement of fed blanks that it will intercept and guide the leading edges of blanks separated and fed by the roll 12 between the opposed cylindrical surfaces of the rock-member 53 and pull-out roll 23.

Also, to adapt the feeder for handling blanks of different thickness, the presser bar 49 is adjustable vertically to provide for varying the width of the space between the opposed cylindrical surfaces of the rock-member 53 and the pull-out roll 23, consisting as shown, of a thumb nut 57 threaded to the upper end of the presser bar 49, which projects above the upper end of the block 48, whereby turning said nut in one direction will operate to raise said bar, together with the foot 50 and rock-member 53 against the force of the spring 51; and in the opposite direction, operating to permit depression of said bar and foot by said spring. Also, said bar and foot are adapted to be secured yieldingly in different adjusted positions by means of engaging angular teeth formed on the block 48 and nut 57, as shown at 58, Figs. 3 and 4.

With the construction shown and described, it is obvious that when the leading edges of "doubles", or blanks, the thickness of which exceeds the normal adjusted width of the space between the opposed cylindrical surfaces of the pull-out roll 23 and the rock-member 53—impelled by the separator roll 12 and the pull-out rolls 23 and 24,—enter between the converging sides of said rock-member and pull-out roll 23, the pull of said pull-out rolls exerted on a "double", or blank of excess thickness, will first turn said rock-member into the position shown, substantially, in Fig. 4, causing a pin 59 secured therein to engage a lug or projection 60 on an arm 61 secured to a shaft 62 mounted to turn in bearings formed in a lug 63 on the block 48 and in the frame member a', thereby turning said shaft and the arm 64 secured thereto substantially to the position shown in Fig. 4, said arm being connected by a link 65 with the arm f' of the cam member F, thereby turning said cam member pivotally to effect engagement of the cam section 43 with the pin 45 secured in the arm 46 secured to the rock-shaft 38, thus permitting turning movement of the shaft 38 by the weight 47 to throw the guide fingers 34 into diverting position shown in Fig. 4, the pull of said pull-out roll and said rock-member continuing until the line of intersection of the cylindrical surface 55 of the rock-member 53 and the outer side of the extension 56 of said rock-member, has passed beyond a plane in which the axes of said rock-member and pull-out roll are positioned, after which the rock member 53 will merely drag on said blanks until the "double" or blank of excess thickness passes out of engagement with said pull-out roll and rock-member, whereupon said rock-member and parts controlled thereby will be restored to their normal operating positions, by means provided for the purpose, as herein fully shown and described.

Applied to the cam-arm f', is a coil spring 66, which connects said arm at a distance from the pivot of the cam-member F, with a fixed pin 67 secured in the side frame a' (see Fig. 4) which, as soon as the double or blank of excess thickness, passes out of engagement with the pull-out roll 23 and the rock-member 53, tends to restore the cam-member F, the shaft 38 and the fingers 34 secured thereto, to their normal operating positions, when feeding single blanks of contemplated thickness—shown in Fig. 3 and defined by engagement of the pin 45 secured in the arm 46 on the shaft 38, with the cam section 42 of the cam section F. The cam member F, however, and its associated parts are positively restored to normal operating positions by a pin 69 secured in one end of a lever 70 pivoted between its ends on a stud 71 secured to the bracket 40, and pivotally connected to the end of the lever 70 opposite to that in which the pin 69 is secured, is a rod 73, which slidably engages a bearing in a lug 74 pivoted to a bracket 75 secured to the rack-bar 18, or an extension thereof. Also secured to the rod 73 at opposite sides of the lug 75 are spaced stops 76, the relation being such that, as the rack-bar 18 reciprocates in operation, the lug 74 will contact with the stops 76, respectively, before said rack-bar reaches the ends of its stroke in opposite directions, as shown in Fig. 4. In the preferable construction shown, also, the stops 76 are adjustable on the rod 73.

With the described construction, it is obvious that by properly adjusting the stops 76 on the rod 73 relative to the lug 74, oscillating movement may be imparted to the lever 70, which by contact of the pin 69 with the cam-arm f of the cam member F, when turned counter-clockwise, as seen in Fig. 4, will turn said cam member pivotally in a direction to restore the link 65, the lever arm 64, the rod 59, the rock-member 53, the shaft 38 and the guide fingers 34, to their normal operating position shown in Fig. 3. The spring 66 is preferably very light so that it will not interfere with the delicacy and sensitiveness of the calipering means. Its real function is to hold the cam F in normal operating position (as shown in Fig. 3) after it has been restored to this position by the rod 73 in the manner described above.

A blank separating and feeding machine embodying my invention and improvements may readily be adapted for effectively separating and feeding blanks of different thickness and stiffness, by the provision of means for presenting the blanks to the separator member at different angles to the line of feed—thicker and stiffer blanks being presented at a more acute angle than thinner and more flexible blanks.

What I now consider preferable means for thus presenting the blanks to the separator roll at desired angles to insure effective separation, is as follows, see particularly Fig. 4: Secured to the rod 2 so as to be adjustable thereon both axially and circumferentially, is a rod 77, mounted on which so as to be adjustable lengthwise thereof, is a head 78, which is adapted to be secured in different adjusted positions on said rod by a set screw 79, or other suitable means, and secured to said head is a presser bar 80, which comprises an intermediate upwardly bowed portion 81, and the ends of which are bent reversely as shown, so that they will bear upon the edges of the pack of blanks adjacent its opposite ends. Obviously, by properly adjusting the position of the bar 80 on the rod 77, the inclination of the blanks to the line of feed may be varied as desired.

While the principal function of the bar 80 is to impart a desired inclination to the blanks d, the thrust of the rack-bar 18 in operation, will impart a slight pivotal movement to the arms 14 on their pivots 15, which will, in turn, operate to raise and lower the bar 80, to a slight extent, thereby imparting a "fanning" or "breathing" movement to the pack of blanks, which will tend to break adhesions between said blanks and thereby materially reduce double feeding.

Where a blank separating and feeding machine embodying my invention and improvements, is designed for separating and feeding blanks of the same general kind, which have only a slight tendency to adhere, and thus cause double feeding; or in cases where an occasional double is not particularly objectionable, the doubles detecting and diverting means may be dispensed with, thus materially simplifying and correspondingly reducing the cost of the machine. Such an adaptation of the machine shown in Figs. 1 to 5 of the drawings—and which also comprises means for delivering separated blanks onto a conveyor board B, supported beneath the feeder A—is shown in Figs. 6 and 7 of the drawings. Said adaptation merely involves the substitution for the guiding and diverting fingers 33 and 34, of a single set of guide fingers, for convenient reference designated 33'; and the omission of all means and mechanism for controlling the operation of the pivoted guide fingers 34 to divert doubles and to restore said fingers to normal non-diverting position,—shown in Figs. 1 to 5 of the drawings and heretofore described.

Parts other than the fingers 33' where present, are designated by the same reference characters as the same or corresponding parts, shown in Figs. 1 to 5.

In accordance with the invention, see Figs. 6 and 7, the guide fingers 33' are secured in fixed position to the heads or blocks 35 mounted on the bar I, in substantially the same manner as the fixed fingers 33, Figs. 3 and 4, said fingers being curved, substantially as shown, and so proportioned and arranged that their upper ends will extend into close proximity to the separator roll 12 of the feeder at a considerable distance above the bottom thereof, and their lower ends being positioned above and closely adjacent the receiving end of the conveyor board B and in such relation thereto that they will guide separated blanks around the discharge end of the feeder and deliver them upon the conveyor board.

In the preferable construction shown the curved edges of said fingers 33', proximate the feeder, define a segment of a substantially cylindrical surface, within which the pull-out roll 23 is positioned.

Throughout the specification and claims, the terms "deflector" and "diverter" have been used to designate the blank guiding and throwout mechanism. When the mechanism is in its normal position to guide blanks from the pack tray to the conveyor board, the mechanism is said to be in its "deflecting" position or "non-diverting" position, and when the mechanism is in position to throw out sheets of excess thickness, the mechanism is said to be in its "non-deflecting" or "diverting" position. Also, the term "feed rolls" is used in a broad sense to include the separator roll 12, caliper roll E, pull out rolls 23 and 24, and any other rolls which may be used to move the blanks from the pack tray to the conveyor board.

I claim:

1. In a machine for the purpose specified, the combination of a frame, blank separating and feeding means mounted thereon, means for guiding said blanks from the feeder to receiving means beneath the same comprising co-acting upper and lower sets of guide fingers of which the lower set is pivotally supported, and means for maintaining said pivoted fingers yieldingly in position relative to the upper set of fingers to define therewith a substantially continuous guide surface corresponding to a contemplated line of feed of single blanks, a rock-shaft to which the pivoted guide fingers are secured, means which define the extreme pivotal positions of said fingers, one of which corresponds to a contemplated line of feed of single blanks and the other effecting diversion of superposed blanks, said means comprising a pull-out roll mounted to rotate on a fixed axis, means for rotating said roll, a movably supported member mounted in association with said pull-out roll having a surface opposed to and spaced from the surface of said pull-out roll and providing sufficient clearance to permit single blanks to pass freely therebetween, but to which motion is imparted by the feeding of superposed blanks, and operative connection between said movably supported member and rock-shaft whereby movement of said movable member will effect turning of said rock-shaft and fingers from one extreme position to the other, and means for restoring said guide and diverting means to normal operating relation upon discharge of said superposed blanks.

2. In a machine for the purpose specified, the combination of a frame, blank separating and feeding means mounted thereon, means for guiding said blanks from the feeder to receiving means beneath the same comprising co-acting upper and lower sets of guide fingers of which the lower set is pivotally supported, means for maintaining said pivoted fingers yieldingly in position relative to the upper set of fingers to define therewith a substantially continuous guide surface corresponding to a contemplated line of feed of single blanks, a rock-shaft to which the pivoted guide fingers are secured, means which define the extreme pivotal positions of said fingers, one of which corresponds to a contemplated line of feed of single blanks, and the other effecting diversion of superposed blanks, said means comprising a pull-out roll mounted to rotate on a fixed axis, means for rotating said roll, a rock-member mounted in association with said pull-out roll having a surface opposed to the surface of said pull-out roll and spaced therefrom to permit single blanks to pass freely therebetween but to which rotation will be imparted by the feeding of superposed blanks, and operative connection between said rock-member and rock-shaft whereby rotation of said rock-member will effect turning of said rock-shaft and fingers from one extreme position to the other.

3. The combination specified in claim 2, and means for restoring said guide and diverting means to normal operating relation upon discharge of said superposed blanks.

4. In a machine for the purpose specified, the combination of a frame, blank separating and feeding means mounted normally thereon, movably supported means for guiding said blanks from the feeder to receiving means beneath the same comprising coacting upper and lower sets of guide fingers of which the lower set is pivotally supported, means for maintaining said pivoted fingers yieldingly in position relative to the upper set of fingers to define therewith a substantially continuous guide surface corresponding to a contemplated line of feed of single blanks, a rock-shaft to which the pivoted guide fingers are secured, means which define the extreme pivotal position of said rock-shaft and fingers, one of which corresponds to a contemplated line of feed of single blanks, and the other permitting diversion of superposed blanks, means applied to said rock-shaft tending to turn said rock-shaft and fingers into position to effect diversion of fed blanks, means normally retaining said rock-shaft and fingers in guiding position against movement by the turning means applied thereto, and means rendered operative by the feeding of superposed blanks for releasing said rock-shaft and fingers from said retaining means and permitting turning movement of said rock-shaft and fingers by the turning means applied thereto to effect diversion of said superposed blanks.

5. In a machine for the purpose specified, the combination of a frame, blank separating and feeding means mounted thereon including a separator roll, movably supported blank guiding means, means for maintaining said guiding means yieldingly in position to permit feeding of blanks in a contemplated line of feed and means rendered operative by the feeding of superposed blanks for positioning said guiding means to effect diversion of said superposed blanks, comprising a rock-shaft to which the blank guiding means are secured, means which define the extreme pivotal positions of said blank guiding means, one of which corresponds to a contemplated line of feed of single blanks and the other effecting diversion of superposed blanks, said means comprising a cam-member movably supported on the machine frame, formed on which is a cam-surface which terminates in stop surfaces, a pin secured eccentrically to said shaft which co-operatively engages said cam and stop surfaces, the relation being such that engagement of said pin with the stop surfaces at opposite ends, respectively, of said cam surface will define the extreme positions of the guide fingers, means for yieldingly maintaining said pin in engagement with said cam and stop surfaces, and means rendered operative by the feeding of superposed blanks for moving said cam from its position of normal feed to its position for effecting diversion of said superposed blanks.

6. The invention as defined in claim 5 and including means for restoring said cam-member to normal operating relation upon discharge of said superposed blanks.

7. The invention as defined in claim 5 and including means for restoring said cam-member to normal operating relation upon discharge of said superposed blanks, consisting of means for positively moving the cam member to that position.

8. The invention as defined in claim 5 and means for restoring said cam-member to normal operating relation upon discharge of said superposed blanks, consisting of a bar supported so as to be movable endwise, means for imparting reciprocating movement thereto, a lever pivoted adjacent said cam-member, means connecting said reciprocating bar and lever for imparting oscillating movement to said lever operative as said bar approaches the limits of its movement in opposite directions, and a projection on said pivoted lever arranged in the path of movement of said cam-member, the relation being such that oscillating movement of said pivoted lever in one direction will permit pivotal movement of said cam-member produced by the feeding of super-posed blanks, and in the other will restore said cam-member to normal operating position.

9. The combination specified in claim 5 which also comprises means for restoring said cam-member to normal operating relation upon discharge of said superposed blanks, consisting of a rock-bar which actuates the separator roll of the feeder, to which reciprocating movement is imparted in operation, a lever pivoted adjacent said cam-member, means connecting said rock-bar and lever for imparting oscillating movement to said lever, and a projection on said pivoted lever arranged in the path of movement of said cam-member, the relation being such that oscillation of said pivoted lever in one direction will permit pivotal movement of said cam-member produced by the feeding of superposed blanks, and in the other will restore said cam-member to normal operating position.

10. The combination specified in claim 5 which also comprises means for restoring said cam-member to normal operating relation upon discharge of said superposed blanks, consisting of a rack-bar which actuates the separator roll of the feeder, to which reciprocating movement is imparted in operation, a lever pivoted adjacent said cam-member, means connecting said rack-bar and lever for imparting oscillating movement of said lever, and a projection on said pivoted lever arranged in the path of movement of said cam-member, the relation being such that oscillation of said pivoted lever in one direction will permit pivotal movement of said cam-member produced by the feeding of superposed blanks, and in the other will restore said cam-member to normal operating position, the connection between said rack-bar member and pivoted lever consisting of a rod one end of which is connected to said pivoted lever, a bracket secured to said rack-bar member, a lug on said bracket provided with a bearing which said rod engages, and stops secured to said rod at opposite sides of and in spaced relation to said bearing lug and which co-operate therewith to impart reciprocating movement of said rod.

11. A machine for feeding paper blanks or the like comprising a pack tray, blank separating and conveying mechanism at the delivery end of the tray including feed rolls adapted to grip each blank and move it through the rolls, a conveyor board directly beneath the pack tray, a blank throw-out device associated with the feed rolls and comprising calipering means adapted to detect blanks of excess thickness, and a deflector positioned immediately adjacent to the feed rolls and normally held in deflecting position, said calipering means being operable to gauge the thickness of the blank at substantially the instant when the blank is gripped by coacting feed rolls and to immediately move the deflector to non-deflecting position whenever a blank of excess thickness passes between the rolls and is detected by the calipering means, the normal position of the deflector being such that blanks of normal thickness pass to the conveyor board in a direction opposed to that with which the blanks leave the tray.

WM. WARD DAVIDSON.